April 8, 1969   KATSUO AOKI ET AL   3,436,812
METHOD OF MAKING THE STATOR CORE FOR ROTARY ELECTRIC MACHINERY
Filed Oct. 6, 1965

INVENTOR
KATSUO AOKI AND
TERUMOTO YAMAGUCHI
By Fenton and Fenton
ATTORNEYS

United States Patent Office 3,436,812
Patented Apr. 8, 1969

3,436,812
METHOD OF MAKING THE STATOR CORE FOR ROTARY ELECTRIC MACHINERY
Katsuo Aoki, Ginza-dori, Kariya-shi, and Terumoto Yamaguchi, Anjo-shi, Japan, assignors to Nippon Denso Kabushiki Kaisha, Showa-machi, Kariya-shi, Japan, a corporation of Japan
Filed Oct. 6, 1965, Ser. No. 493,350
Int. Cl. H02k 15/02; H01f 7/06
U.S. Cl. 29—596                                   7 Claims

ABSTRACT OF THE DISCLOSURE

This disclosure concerns a method of making a stator core wherein a strip is wound edgewise about a mandrel and cut axially to form ring plates, thereafter the ring plates are separated, a winding slot is punched in each plate, and the plates are reassembled with the slots aligned and the gaps non-aligned.

---

This invention relates to a method of making the stator core for rotary electric machinery.

Heretofore, a stator core of the kind here described has been made by winding a strip edgewise about a mandrel so as to coil up into a block-layer after the strip has been punched to form winding slots. Using this manner of fabrication, the manufactures are not satisfactory because of an irregularity of winding slots and other inaccuracies. In addition, when an additional peripheral recess slot as for welding or receiving a clamping bolt and/or a non-circular contour such as a prism contour is required, such an additional fabrication as cutting must be carried out.

One object of this present invention is to provide a method of making the stator core for rotary electric machinery whereby more accurate manufactures are obtained.

Another object of this present invention is to provide a method of making the stator core for rotary electric machinery whereby such additional fabrication becomes unnecessary.

In accordance with the general features of this present invention, a strip is at first wound edgewise about a mandrel to form a coil of the strip and then the coil is cut along a radius in an axial plane to form a plurality of ring plates each having a radial gap. The so cut pieces are separated. At least one winding slot is punched out on the inner periphery of each of the ring plates spaced at unequal angles from the gap one after another. The ring plates then are laminated or stacked one upon another in such a manner that the winding slots formed in the ring plates are overlaid one upon another but the radial gaps are not overlaid.

The present invention will be better understood and other objects and additional advantages of the invention will become apparent upon perusal of the following description taken in connection with the drawings, in which.

Figure 1:
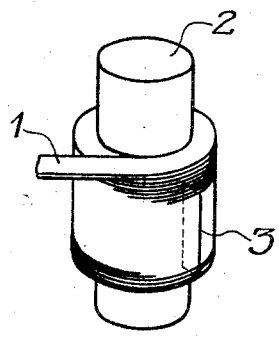
FIG. 1 is an explanatory view of the first step of the method in accordance with this invention.
Figure 2:
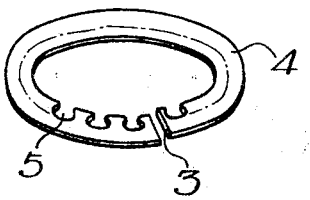
FIG. 2 is a perspective view of a ring plate after fabricated in a third step of the method in accordance with this invention.

Referring more particularly to the drawings, the preferred embodiment of this present invention will now be described; however, this description will be understood to be illustrative of the invention and not as limiting it to the particular steps shown and described. A strip 1 is at first wound edgewise about a mandrel 2 having a diameter corresponding to the inner diameter of the strator core to be made. The strip 1 is thus edgewise wound and laminated or stacked so as to obtain a close laminated coil of the strip. Due to the edgewise winding, the cross section of the strip 1 is generally deformed so that it is preferred to use a strip having a cross section which becomes a true rectangle after the edgewise winding has been completed.

Then in a second step, the coil of the edgewise wound strip 1 is cut along a radius in an axial plane to form a plurality of ring plates 4 each having a radial gap 3. These plates then are separated. Then in a third step the ring plate 4 is provided on its inner periphery with at least one winding slot 5 having a required shape by means of punching. The different ring plates have the winding slot 5 at different angular spacings from radial gap 3. A plurality of spaced winding slots may be formed.

Figure 3:
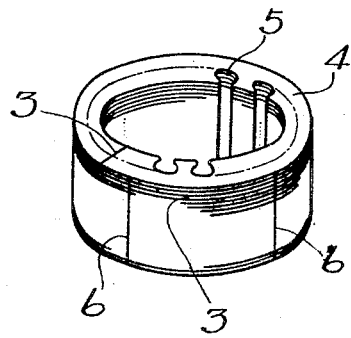
FIG. 3 is a perspective view of a stator core produced by the method in accordance with this invention.

In the fourth step of the method, the ring plates 4 having the winding slot 5 are laminated or stacked one upon another and circumferentially oriented in such a manner that the winding slots 5 are aligned one upon another in axial alignment but the radial gaps 3 are not overlaid one upon another as shown in FIG. 3. The laminated ring plates are, after being well-shaped, welded one to another along several peripheral longitudinal lines 6 parallel to the axis in the external cylindrical surface of the stator core.

By virture of the method in accordance with this present invention, in which the ring plate 4 is punched after it has been made but the long strip 1, the starting material, is not punched before the edgewise winding, the product becomes far more accurate. If provision of an additional outer peripheral recess as for welding or receiving a clamping bolt slot and/or a non-circular contour of the plates such as a prism contour is required in the stator core produced, it may be fabricated at the same time with the formation of the winding slots 5. Therefore, it is very desirable to use this method in accordance with this invention in order to mass-produce such stator cores.

While a particular embodiment of the invention has been illustrated and described, modifications thereof will readily occur to those skilled in the art. It should be understood therefore that the invention is not limited to the particular steps and procedures disclosed but that the appended claims are intended to cover all modifications which do not depart from the true spirit and scope of the invention.

What is claimed as new and desired to be secured by Letters Patent of the United States is:

1. A method of making a stator core for rotary electric machinery, comprising the successive steps of edgewise winding a strip about a mandrel so as to form a coil, cutting said coil along a radius in an axial plane to form a plurality of radial gapped ring plates, separating said plates, punching at least one winding slot from each said gapped ring plate, and laminating said gapped ring plates each having at least one winding slot one upon another in such a manner that said winding slot of one of said plates is aligned on the same of the other of said plates in axial alignment but said radial gap of one of said plates is angularly displaced from the same of the other of said plates.

2. A method of making a stator core for the rotary electric machinery as claimed in claim 1, in which said laminated plates are welded along at least one axial line in the outer cylindrical surface.

3. A method of making a stator core for rotary electric machinery, as claimed in claim 1, in which at least one peripheral recess slot is formed at the same time with the formation of said winding slot.

4. A method of making a stator core for the rotary electric machinery, as claimed in claim 1, in which a prism of said stator core is formed at the same time with the formation of said winding slot.

5. The method of making a stator core for rotary electric machinery employing a mandrel, which consists of the successive steps of winding a metal strip edgewise around said mandrel to form an axially symmetrical helical coil, removing said coil from said mandrel, cutting a radial slot through all of the turns of said helical coil, separating the individual annular plates so formed from the individual turns of said coil, pucnhing a winding slot on the inner periphery of each said annular plates at different unequal angular spacings from the radial slot in each said annular plate, stacking said so formed annular plates with the winding slots in all plates longitudinally aligned and the radial slots in adjacent plates angularly mutually displaced, and fastening together the so stacked plates into a unit.

6. The method according to claim 5, in which a plurality of spaced winding slots are punched on the inner periphery of each said annular plate.

7. The method according to claim 5, with the additional step of forming said plates with a prismatic contour.

References Cited

UNITED STATES PATENTS

| | | | |
|---|---|---|---|
| 1,920,354 | 8/1933 | Carpenter | 310—259 |
| 2,973,494 | 2/1961 | Ellis | 336—217 |
| 3,113,375 | 12/1963 | Somerville et al. | 29—605 |
| 3,283,399 | 11/1966 | Hart et al. | 29—605 |

JOHN F. CAMPBELL, *Primary Examiner.*

C. E. HALL, *Assistant Examiner.*

U.S. Cl. X.R.

29—605